Aug. 31, 1954  H. ASHWORTH ET AL  2,687,647
GYROSCOPIC DEVICE
Filed May 25, 1942
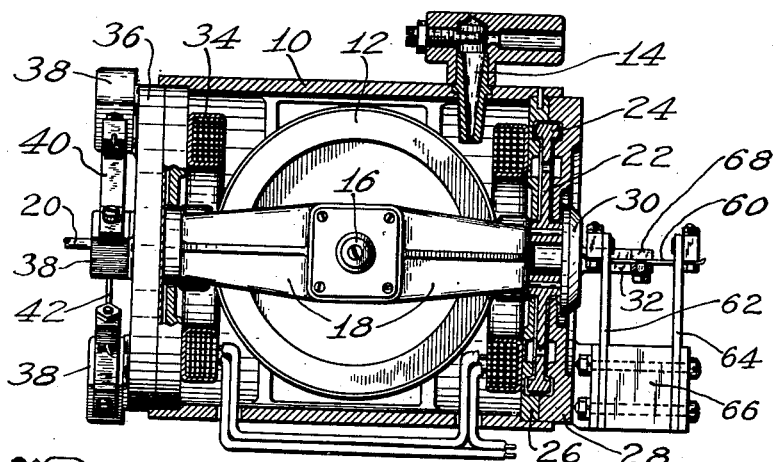
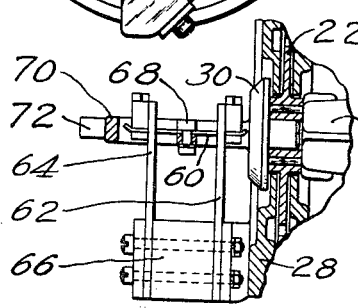
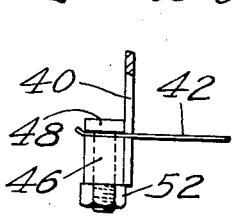
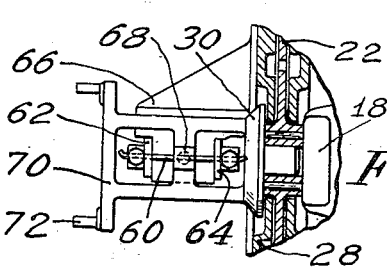
INVENTORS
Harry Ashworth
Edward F. Bentley
BY
Fish, Hildreth, Cary & Jenney
ATTORNEYS Patented Aug. 31, 1954

2,687,647

UNITED STATES PATENT OFFICE 2,687,647

GYROSCOPIC DEVICE

Harry Ashworth, Somerville, and Edward P. Bentley, Wollaston, Mass., assignors, by mesne assignments, to Research Corporation, a corporation of New York Application May 25, 1942, Serial No. 444,370

23 Claims. (Cl. 74—5)

The present invention relates to gyroscopic devices, and more particularly to angular rate gyroscope devices of the type described in the copending applications of Draper and Bentley, Serial Nos. 385,916, for Lead Angle Computor for Gun Sights, filed March 29, 1941, and 440,660, now Patent No. 2,609,606, dated September 9, 1952, for Gunsight Having Lead Computing Device, which are particularly useful for computing lead angles for fire control systems.

In such devices, the required accuracy necessitates limiting precessional deflections to a small angle. It is therefore essential to provide a mounting or support for the gimbal frame which has a good "zero," and which moreover responds in an exact manner to the precessional torque. For these purposes, gimbal frame bearings of conventional form have been found unsuitable.

One object of the present invention is to provide a gimbal frame mounting which has the desired characteristics explained above. Another object is to provide a mounting which will properly support the gyro element in any orientation thereof, and which, particularly in the case of fire controls, will withstand the shock or impact of firing without impairment of accuracy. To these ends, the present invention comprises the gyro device hereinafter described and claimed.

In the accompanying drawings, Fig. 1 is a sectional elevation of the preferred form of gyro unit; Fig. 2 is a front end elevation showing one form of suspension; Fig. 3 is a plan view of the preferred form of rear end suspension; Figs. 4, 5 and 6 are detail views illustrating the method of clamping the supporting wires; and Figs. 7 and 8 are elevation and plan views respectively of a modified form of the invention, in which the same type of suspension is used at both ends of the unit.

The preferred form of the invention is shown in Fig. 1 and comprises a casing 10, enclosing a rotor 12 having on its periphery suitable buckets to be driven by an air jet introduced through the nozzle 14. The rotor is rotated about its spin axis, indicated at 16. The rotor shaft is journaled in the frame 18, which is referred to as the bearing frame or gimbal frame. At the forward end of the unit, the frame is provided with a shaft 20. At each end, the frame carries a damping member 22. As shown in Fig. 1, this damping member comprises a disk having on its outer periphery a flange 24. The damping member fits closely within but out of contact with suitably shaped end members 26 and 28, forming a part of the casing. The lower portion of the internal space between the members 26 and 28 is filled with a damping fluid, as is more fully described in the above-mentioned copending application of Draper and Bentley. The damping member is retained between the frame and an outside disk 30. The disk 30 at the rear of the unit is formed with an integral yoke 32 to be presently described in detail.

As viewed in Fig. 1, the longitudinal axis is the axis of precession about which the frame 18 is subject to small angular displacements when the gyro as a whole is turned about a vertical axis. It will be understood that for fire control purposes two gyro units are used to compute lead angles for movement of the gun in turn and in elevation, but for the purposes of the present invention a description of one unit only will suffice.

The unit is provided with heating coils 34, which are controlled by thermostatic means to maintain the damping fluid at substantially a constant temperature.

The frame 18 is not journaled in bearings of conventional form, but is suspended by the end structures shown in Figs. 2 and 3. Preferably the structure shown in Fig. 2 is used for the front end and that of Fig. 3 for the rear end.

The front end suspension shown in Fig. 2 comprises a supporting disk 36 secured to and forming a part of the housing. At regular intervals around the disk and near the periphery thereof, there is provided a series of bosses 38, preferably four in number. A cantilever leaf spring 40 is secured at its outer end to each boss 38, and the inner ends of the several springs 40 terminate at diametrically opposed positions, as indicated in Fig. 2.

The gyro frame is supported by two crossed wires 42 and 44, preferably piano wire, each of which is clamped to the shaft 20 and also to an opposed pair of springs.

The manner of clamping the wires to the shafts and to the springs is important. These clamping arrangements are shown in enlarged detail in Figs. 4 to 6. As shown in Fig. 4, there is provided at the free end of each spring 40 a block 46 having a longitudinal bore to receive the shank of a bolt 48. The shank is drilled with a small hole 50 below the head 48. The end of the wire 42 is passed through a suitable hole in the spring 40 and also through the hole 50. The bolt is maintained against turning by allowing one of the flat sides of the bolt head to lie against the spring. The bolt and wire are finally clamped in position by a nut 52. Since the hole 50 in the shank of the bolt is spaced slightly away from the head 48, the wire 42 is pinched slightly, thereby insuring its being clamped permanently in its set position.

For connection of the wires to the shaft 20, the shaft is notched as indicated at 54 and 56, the notch extending inwardly to approximately the center of the shaft so that the crossed wires will accurately center the shaft. Each wire is clamped to the shaft by a bolt and nut assembly 58, exactly similar to that described for Fig. 4. It will be noted that each bolt head is positioned by engagement of its flat sides within the notch 54 so that the wires are prevented from twisting with respect to the shaft.

In manufacture, the springs 40 are set up in a suitable jig to apply a predetermined bending stress to the springs, whereby the crossed wires will be permanently maintained under an exact tension. The wires are threaded through the holes of the several clamping bolts and the nuts are applied thereto when the shaft is properly centered.

The suspension shown in Fig. 2 may, if desired, be used for both ends. It may be noted, however, that this form does not resist axial movement of the gimbal frame. To provide axial or longitudinal stability, therefore, the suspension shown at the right hand end of Fig. 1 and in Fig. 3 is preferred. This suspension includes the yoke 32 previously described. This yoke is clamped to a longitudinal wire 60, the ends of which are clamped to two vertical leaf springs 62 and 64. The lower ends of the springs are suitably attached to a bracket 66 mounted on the end of the casing. The wire 60 is secured to the springs 62 and 64 by clamping bolts exactly as shown in Fig. 4, and the yoke 32 is similarly clamped to a mid-point of the wire by a bolt arrangement 68 similar to that used for the shaft 20. As indicated in Fig. 1, the head of the bolt 68 fits into a notch formed in the yoke. The wire 60 aligns with the shaft 20, that is, it is disposed in the precession axis of the gyro. The wire 60 is maintained under suitable tension by the springs 62 and 64, which are bent slightly toward each other in a suitable jig during the operation of assembly. The rear support, as shown, provides longitudinal stability in any orientation of the gyro unit.

The gyro is spring centralized, preferably by the device described in the above-mentioned Draper and Bentley applications. The amount of precessional displacement may be indicated by any suitable indicating device connected with the shaft 20 and associated with any suitable multiplying levers, linkages or the like. For fire control purposes, the arrangement shown in the above-mentioned Draper and Bentley application is preferred, wherein an indicating arm secured to the shaft 20 is utilized to operate a mirror. These details are sufficiently shown in the foregoing applications and are not repeated in Fig. 1.

If desired, the suspension of the type shown in Fig. 3 may be used at both ends. In Figs. 7 and 8, there is shown a front end suspension utilizing the axial wire. It is in all respects similar to that shown in Fig. 3, except that the yoke member 68 is extended as indicated at 70 to provide knife edged members 72 as part of the spring centralizing mechanism of the type shown in the said Draper and Bentley applications. The members 72 are engaged between parallel leaf springs which are adjustable laterally towards and from the axis to provide an adjustable elastic torque to oppose the precession torque.

In the construction of Fig. 1, under the action of a precession torque, the frame precesses about the axis of the shaft 20 and the wire 60. The movement is taken up by a slight flexure of the springs 40 and also by twisting of the wire 60. The tension of the springs 40 is not primarily relied on to resist the precessional torque, since the elastic torque is afforded by the spring centralizing means, preferably of the type described in the said Draper and Bentley applications. The springs 40 serve to maintain the axis of the shaft in its proper position. Under severe shock or impact, the springs 40, as well as the springs 62 and 64, yield sufficiently to prevent damage to the instrument. It will be understood that the impact is absorbed by the damping fluid, and to this end the flange 24 of the damping member is purposely made of considerable area.

In the construction utilizing the axial wire at both ends, support is likewise afforded by the fact that the springs maintain the wire sufficiently taut to position the gimbal frame axis, and also to yield slightly under impact and thus prevent damage to the wires and other parts.

Having thus described our invention, we claim:

1. In an angular rate gyroscope having a rotor, a bearing frame within which the rotor is mounted for spinning about an axis, and an outer casing, a support for the bearing frame including wires fixedly mounted with respect to the casing and secured to the bearing frame for pivotally supporting the frame for precession about an axis at an angle to the axis of spin, and leaf spring members for maintaining said wires under tension.

2. In an angular rate gyroscope having a rotor, a bearing frame within which the rotor is mounted for spinning about an axis, and an outer casing, a support for the bearing frame including cross wires secured to the frame for pivotally supporting the frame for precession about an axis at an angle to the spin axis, and leaf spring members secured to the casing and clamped at their free ends to the wires to maintain the wires under tension.

3. In an angular rate gyroscope having a rotor, a bearing frame within which the rotor is mounted for spinning about an axis, and an outer casing, a support for the bearing frame to permit precession about an axis at an angle to the spin axis comprising a wire disposed along the axis of precession, spring members secured to the ends of the wire to maintain the wire under tension, and means for securing the frame to an intermediate point of the wire.

4. In an angular rate gyroscope, a rotor, a bearing frame within which said rotor is mounted for spinning about an axis, an outer casing, and means for pivotally mounting said frame in said casing for precession about a second axis at an angle to said axis of spin, including a plurality of leaf springs placed symmetrically around said precession axis, and connected at their outer portions to said casing, and cross wires connecting the free portions of said leaf springs to said frame for pivotally supporting the frame.

5. In an angular rate gyroscope, a rotor, a bearing frame within which said rotor is mounted for spinning about an axis, an outer casing, and means for pivotally mounting said frame in said casing for precession about a second axis at an angle to said axis of spin, including a plurality of leaf springs placed symmetrically around said precession axis at one end of the gyroscope and connected at their outer portions to said casing and at the free portions to said frame for pivotally supporting the frame, a wire extending along the precession axis at the other end of said casing clamped at its ends against axial movement and twisting, and means clamping said bearing frame to a mid point of said wire, whereby said frame is pivotally supported and axial movement of the frame prevented.

6. In an angular rate gyroscope, a rotor, a bearing frame within which said rotor is mounted for spinning about an axis, an outer casing, and means for pivotally mounting said frame in said casing for precession about a second axis, including a wire clamped at a mid point to said frame and clamping means for securing the outer ends of said wire to said casing for pivotally supporting the frame and preventing axial movement thereof.

7. In an angular rate gyroscope, a rotor, a bearing frame within which said rotor is mounted for spinning about an axis, an outer casing, and means for pivotally mounting said frame in said casing for precession about a second axis, including a spring wire extending in opposite directions from said frame and leaf springs clamped at one end to said casing and at their free ends to each end of said wire for pivotally supporting the frame.

8. In an angular rate gyroscope, a rotor, a bearing frame within which said rotor is mounted for spinning about an axis, an outer casing, and trunnions for pivotally mounting said frame in said casing for precession about a second axis, including a tension member radially extending in opposite directions from one trunnion, a pair of leaf springs secured at one end to said casing, clamping means for securing the outer ends of said member to said springs for pivotally supporting the frame, a wire adjacent the other trunnions of said gyroscope and axially supported with respect thereto, and means clamping said trunnion to said wire for pivotally supporting said frame.

9. In an angular rate gyroscope, a rotor, a bearing frame within which said rotor is mounted for spinning about an axis, an outer casing, and means for pivotally mounting said frame in said casing for precession about a second axis, including a spring wire for both pivotally supporting the frame and preventing axial movement thereof, said wire being secured at its outer ends to said casing under tension to lie an axial alignment with said precession axis and secured intermediate said ends to said frame.

10. In an angular rate gyroscope having a rotor, a bearing frame within which the rotor is mounted for spinning about an axis, and an outer casing, a support for the bearing frame comprising a wire extending along the axis of precession, a pair of leaf springs mounted on the casing, means for clamping the wire at its ends to the springs, and means for clamping a part of the frame to an intermediate portion of the wire.

11. In an angular rate gyroscope having a rotor, a bearing frame within which the rotor is mounted for spinning about an axis, and an outer casing, a support for the bearing frame comprising a wire extending along the axis of precession, a pair of leaf springs mounted on the casing, means for clamping the wire at its ends to the springs, and means for clamping a part of the frame to an intermediate portion of the wire, said clamping means comprising bolts secured to the frame and springs, the bolts having holes through which the wire passes.

12. In an angular rate gyroscope having a rotor, a bearing frame within which the rotor is mounted for spinning about an axis, and an outer casing, a support for the bearing frame to permit precession about an axis at an angle to the spin axis comprising a wire disposed along the axis of precession, means to maintain the wire under tension, and means for securing the frame to an intermediate point of the wire.

13. Means for mounting the rotor frame of a gyroscopic instrument in the casing thereof comprising a pair of spaced cantilever springs having one end thereof secured to the casing, and an axis-defining pair of torsion wires fixed to opposite sides of the frame connected under tension to the respective free ends of said cantilever springs.

14. Means for mounting the rotor frame of a gyroscopic instrument in the casing thereof including a cantilever spring having one end thereof fixed to the casing, and an axis-defining torsion wire fixed to one side of the frame connected under tension to the free end of said cantilever spring.

15. Means for mounting the rotor frame of a gyroscopic instrument comprising a casing, a pair of spaced cantilever springs mounted on said casing, and axis-defining means for supporting the frame between the springs comprising a pair of taut wires, the ends of which connect the frame and the respective free ends of the cantilever springs.

16. Means for mounting the rotor frame of a gyroscopic instrument comprising a casing, a pair of torsion wires fastened to the frame on the opposite sides thereof, and a pair of spaced cantilever springs mounted on said casing to which the wires are respectively connected to load the springs and place the wires under sufficient tension to define the axis of the frame.

17. Means for mounting the rotor frame of a gyroscopic instrument including a casing, a torsion wire fastened to the frame, and a cantilever spring mounted on the casing to which the wire is connected to load the spring and stretch the wire along the axis of the frame.

18. In a gyroscopic instrument of the angular rate type, a casing, a rotor bearing frame, a rotor mounted in said frame to spin about a first axis, and means for supporting said frame for movement about a second axis perpendicular to the first axis including a pair of spaced cantilever springs mounted on said casing and a pair of axis defining wires fixed to opposite sides of the frame and fastened to the respective free ends of the spaced springs.

19. A gyroscopic instrument as claimed in claim 17, in which the fastening between the cantilever springs and the spaced wires comprises clamping members attached to the free ends of the cantilever springs by which the spaced wires are adjustably secured.

20. An angular rate gyroscope comprising an outer casing, a short wire stretched between spaced parts of said casing at one end thereof, a precession trunnion of the gyroscope adjacent such parts, and means for clamping said trunnion to a midportion of said wire, whereby said wire serves to spring-support and spring-centralize said gyroscope and prevent endwise movement thereof.

21. An angular rate gyroscope comprising an outer casing, a short wire stretched between spaced parts of said casing at each end thereof, a precession trunnion of the gyroscope adjacent each end of the casing, and means for clamping each of said trunnions to a midportion of each wire, whereby said wires serve to spring-support and spring-centralize said gyroscope and prevent endwise movement thereof.

22. In an angular rate gyroscope, a rotor and rotor bearing frame, an outer casing, and means for pivotally mounting said frame about a precession axis and spring-centralizing the same within said casing, including a short wire at each end of said frame extending along said precession axis, each of said wires being clamped at three points and stretched between the two outer points, the two outer points being secured to one of said frame or casing and the middle point being secured to the other of said frame or casing.

23. An angular rate gyroscope comprising an outer casing, a pair of flat spring members adjacent each end of said casing secured at their outer ends to the interior of said casing, a wire stretched between the inner ends of said springs, a rotor bearing frame within said casing having a pair of spaced trunnions and means for pivotally mounting and spring-centralizing said trunnions and frame, comprising a clamping means clamping each trunnion to a mid point of each wire.

References Cited in the file of this patent

UNITED STATES PATENTS

| Number | Name | Date |
| --- | --- | --- |
| 2,291,612 | Draper | Aug. 4, 1942 |

FOREIGN PATENTS

| Number | Country | Date |
| --- | --- | --- |
| 7,285 | Great Britain | 1910 |